United States Patent
Feldman et al.

(10) Patent No.: US 6,977,471 B2
(45) Date of Patent: Dec. 20, 2005

(54) ELECTROLUMINESCENT DEVICE

(75) Inventors: Harold Feldman, Lawrence, NY (US); Yoel Ganor, Jerusalem (IL)

(73) Assignee: Live Wire Enterprises, Inc., Lawrence, NY (US)

( * ) Notice: Subject to any disclaimer, the term of this patent is extended or adjusted under 35 U.S.C. 154(b) by 0 days.

(21) Appl. No.: 10/843,961

(22) Filed: May 11, 2004

(65) Prior Publication Data

US 2005/0253530 A1    Nov. 17, 2005

(51) Int. Cl.$^7$ ............................................. G09G 3/10
(52) U.S. Cl. ............................. 315/169.3; 315/209 R; 315/291; 315/224; 315/149; 315/307
(58) Field of Search ....................... 315/169.3, 209 R, 315/291, 224, 244, 149, 150, 156, 158, 307, 315/246, 312; 345/76, 77, 102

(56) References Cited

U.S. PATENT DOCUMENTS

| | | | | |
|---|---|---|---|---|
| 3,749,977 A | * | 7/1973 | Sliker | .............. 315/276 |
| 4,238,793 A | * | 12/1980 | Hochstrate | ........... 345/102 |
| 4,253,097 A | * | 2/1981 | Hochstrate | ........... 345/102 |
| 4,254,362 A | * | 3/1981 | Tulleners | .............. 315/219 |
| 4,449,075 A | * | 5/1984 | D'Onofrio et al. | ...... 315/169.3 |
| 4,574,342 A | * | 3/1986 | Runyan | .............. 363/134 |
| 4,611,150 A | * | 9/1986 | Ball et al. | ............. 315/307 |
| 4,633,141 A | * | 12/1986 | Weber | .............. 315/307 |
| 5,440,208 A | * | 8/1995 | Uskali et al. | ......... 315/169.3 |
| 2003/0067274 A1 | * | 4/2003 | Kinnally | .............. 315/169.3 |

\* cited by examiner

*Primary Examiner*—Haissa Philogene
(74) *Attorney, Agent, or Firm*—Abelman, Frayne & Schwab

(57) ABSTRACT

An electroluminescent (EL) device achieves a significant increase in the lifetime of EL light sources by using a driver having a standard DC-to-AC inverter generating a high-frequency quasi-sinusoidal signal, and a generator of low-frequency rectangular pulses. The inverter and the generator are connected so that the quasi-sinusoidal signal is fed to the EL light source in packets. The duration of a packet is equal to the duration of the rectangular pulse. The duration of the rectangular pulses and of the packets remains constant during the entire operating cycle of the EL light source. The duration of intervals between rectangular pulses and between packets is variable, causing changes in the duty cycle, and is determined by the signal passing through a feedback circuit having an EL light source, a photosensitive element, an amplifier, and an input of the rectangular signal generator.

10 Claims, 5 Drawing Sheets

Life Time of EL Light Source

ELECTROLUMINESCENT DEVICE

BACKGROUND OF THE INVENTION

1. Field of the Invention

The present invention relates to electroluminescent devices, and more specifically, to electroluminescent devices with enhanced lifetime.

2. Description of the Related Art

Conventionally, an electroluminescent (EL) light source comprises two congruently disposed electrodes, one of them being transparent within the optical spectral region, with dielectric and electroluminescent layers located in-between. Applying alternating voltage with corresponding frequency and amplitude, for example, within the ranges of $10^2$ Hz–$10^4$ Hz, 30 V–300 V, to the electrodes, the electroluminescent layer starts emitting light throughout the transparent electrode. In the course of operation, degradation processes occur in the light-emitting layer, which lead to a decrease in the brightness of the EL light source and a simultaneous growth of its impedance. Sometimes this process is called aging of the EL light source. The lifetime of the EL light source is defined as the time of continuous luminescence with the luminescence brightness decreasing down to half of the initial brightness, known as the half-decay time. The higher the frequency and the amplitude of the input voltage, the higher is the initial brightness of the EL light source. However, in this case its lifetime is shorter than in the case of applying input voltage with a lower frequency and amplitude.

Standard EL light source drivers are known and in use, which are described, for instance, in the U.S. patents listed in Table 1:

TABLE 1

| U.S. Pat. No. | Issue Date | Patentee | Class/Subclass |
|---|---|---|---|
| 3,749,977 | Jul. 31, 1973 | Sliker | 315/283 |
| 4,254,362 | Mar. 3, 1981 | Tulliners | 315/219 |
| 4,611,150 | Sep. 9, 1986 | Ball et al. | 315/307 |
| 4,633,141 | Dec. 30, 1986 | Weber | 315/307 | with each of U.S. Pat. Nos. 3,749,977; 4,254,362; 4,611,150; and 4,633,141 being incorporated herein by reference.

The devices disclosed in U.S. Pat. Nos. 3,749,977; 4,254,362; 4,611,150; and 4,633,141 are DC-to-AC inverters for converting DC voltage into AC voltage with a specified frequency and amplitude, and with an output signal shape close to a sinusoidal shape. The transformer of the DC-to-AC inverter determines the output voltage and also plays a role in determining the frequency. An EL light source together with a DC-to-AC inverter constitute a compensating integrated circuit. The capacitance of the EL light source coupled with the inductance of the secondary coil of the transformer constitute a tunable LC circuit. The DC-to-AC inverter functions as a resonating oscillator compensating for the decreasing capacitance of an aging EL light source. As the EL light source ages, the DC-to-AC inverter compensates for the decrease in the output brightness by increasing its output voltage and frequency. The use of DC-to-AC inverters described above increases the lifetime of EL light sources by about 20%–30% in comparison with the lifetime of the EL light source fed with an input AC voltage with frequency and amplitude unchanging in time.

A much more efficient method of compensating for the processes of EL light source aging was proposed in U.S. Pat. No. 5,440,208, issued Aug. 8, 1995 to Uskali et al., in class/subclass 315/169; with U.S. Pat. No. 5,440,208 being incorporated herein by reference.

According to U.S. Pat. No. 5,440,208, a driver is disclosed which involves a feedback circuit comprising a voltage drop divider using a resistor connected in series with the EL light source. The voltage drop on this resistor is changed in the process of the EL light source aging. The voltage from this divider is fed to one of the inputs of a pulse generator, so that as the EL light source ages, pulse amplitude increases. A serious drawback of the proposed solution is that it involves a high initial dissipated power, and besides, the shape of the generated signal is far from being sinusoidal, which intensifies the degradation processes in the EL light source.

Several types of drivers are known with a high-frequency sinusoidal signal fed in packets. As a rule, such drivers are used to feed multi-segment EL light sources, as described in the U.S. patents listed in Table 2:

TABLE 2

| U.S. Pat. No. | Issue Date | Patentee | Class/Subclass |
|---|---|---|---|
| 4,238,793 | Dec. 9, 1980 | Hochstrate | 345/102 |
| 4,253,097 | Feb. 24, 1981 | Hochstrate | 345/102 |
| 4,449,075 | May 15, 1984 | D'Onofrio et al. | 315/196 | with each of U.S. Pat. Nos. 4,238,793; 4,253,097; and 4,449,075 being incorporated herein by reference.

FIG. 1 shows an electrical schematic diagram of one of several types of available DC-to-AC inverters 10 for EL light sources in the prior art. If the selection of resistors 12, 14 and transistor 26 is correct, the inverter 10 generates a quasi-sinusoidal signal. The parameters of a resonant circuit 19, formed by a secondary inductance 22 of the transformer 23 and capacitance of the EL light source 32, determine the frequency of the output signal of DC-to-AC inverter 10. The turn ratio of the transformer 23 and the current generated in an auxiliary coil 28 wound on the core 24 of the transformer 23 determine the amplitude of the signal generated by the DC-to-AC inverter 10. In the process of the EL light source operation, as a result of complicated physical processes of degradation or aging, its luminescence brightness decreases with a simultaneous increase in the impedance of the EL light source, mainly due to the capacitance decrease. In this situation, the parameters of the oscillatory resonant circuit 19 and, to a lesser extent, the current generated in the coil 28, are changed. Due to these changes, the frequency and amplitude of the quasi-sinusoidal signal at the output of the DC-to-AC inverter 10 increase. This results in the increase of luminescence brightness, which partly compensates for the brightness decrease caused by the light source aging. Respectively, the lifetime of the EL light source increases in comparison with the lifetime of a similar EL light source fed by AC voltage with constant values of the sinusoidal signal frequency and amplitude. FIG. 9 shows a plot of the dependence of the luminescence brightness of the EL light source on light emitting time for various types of drivers. Curve 78 relates to the supply of AC voltage with parameters that remain unchanged in time, whereas curve 80, which relates to the supply of AC voltage using the DC-to-AC inverter 10 as shown by the schematic diagram, is presented in FIG. 1. Here the initial values of the EL light source brightness are the same in both cases. It is evident that the EL light source lifetime in curve 80 is generally about 30% longer than the lifetime represented by curve 78.

BRIEF SUMMARY OF THE INVENTION

It is an objective of the present invention to achieve a significant increase in the lifetime of EL light sources of any type in comparison with the lifetime of EL light sources operated by standard DC-to-AC inverters. According to the present invention, the above objective is achieved by feeding the EL light source using a driver which comprises, side-by-side, a standard DC-to-AC inverter generating a high-frequency quasi-sinusoidal signal, and a generator of low-frequency rectangular pulses. The inverter and the generator are connected in such a way that the quasi-sinusoidal signal is fed to the EL light source in packets.

The duration of a packet is equal to the duration of the rectangular pulse. The duration of the rectangular pulses, and, respectively, that of the packets of quasi-sinusoidal pulses, remains constant during the entire operating cycle of the EL light source. The duration of intervals between rectangular pulses, and, respectively, between packets of quasi-sinusoidal pulses is variable, causing changes in the duty cycle, and is determined by the signal passing through a feedback circuit comprising:

a) an EL light source;
b) a photosensitive element, for example, a photoresistor, optically connected to an EL light source;
c) an amplifier of the photosensitive element output; and
d) an input of the rectangular signal generator.

In the process of the EL light source operation, its brightness declines due to its aging, which leads to a change in the voltage drop across the photosensitive element. This voltage change is amplified and fed to the input of the rectangular-pulse generator, causing a decrease in the duration of the intervals between rectangular pulses. This is equivalent to a decreasing interval between the packets of high-frequency pulses supplied to the EL light source. Thus, the duration of quasi-sinusoidal signal fed to the EL light source increases, which substantially compensates for the brightness drop. Thus, the EL light source lifetime increases substantially.

To eliminate attenuation "tails" in the packets of high-frequency pulses, the output of the DC-to-AC inverter is shorted before the onset of intervals of the low-frequency rectangular signal.

A capacitor with a respective capacitance may be connected in series with the EL light source. In this case, an increase in impedance and, respectively, a decrease in the capacitance of the EL light source lead to voltage redistribution. Thus, as the EL light source degrades, the effective value of the voltage applied to it increases, which also results in the compensation for the brightness loss and in the increased lifetime.

BRIEF DESCRIPTION OF THE SEVERAL VIEWS OF THE DRAWINGS

Preferred embodiments of the invention are disclosed hereinbelow with reference to the drawings, wherein.

DETAILED DESCRIPTION OF THE INVENTION

Figure 2:
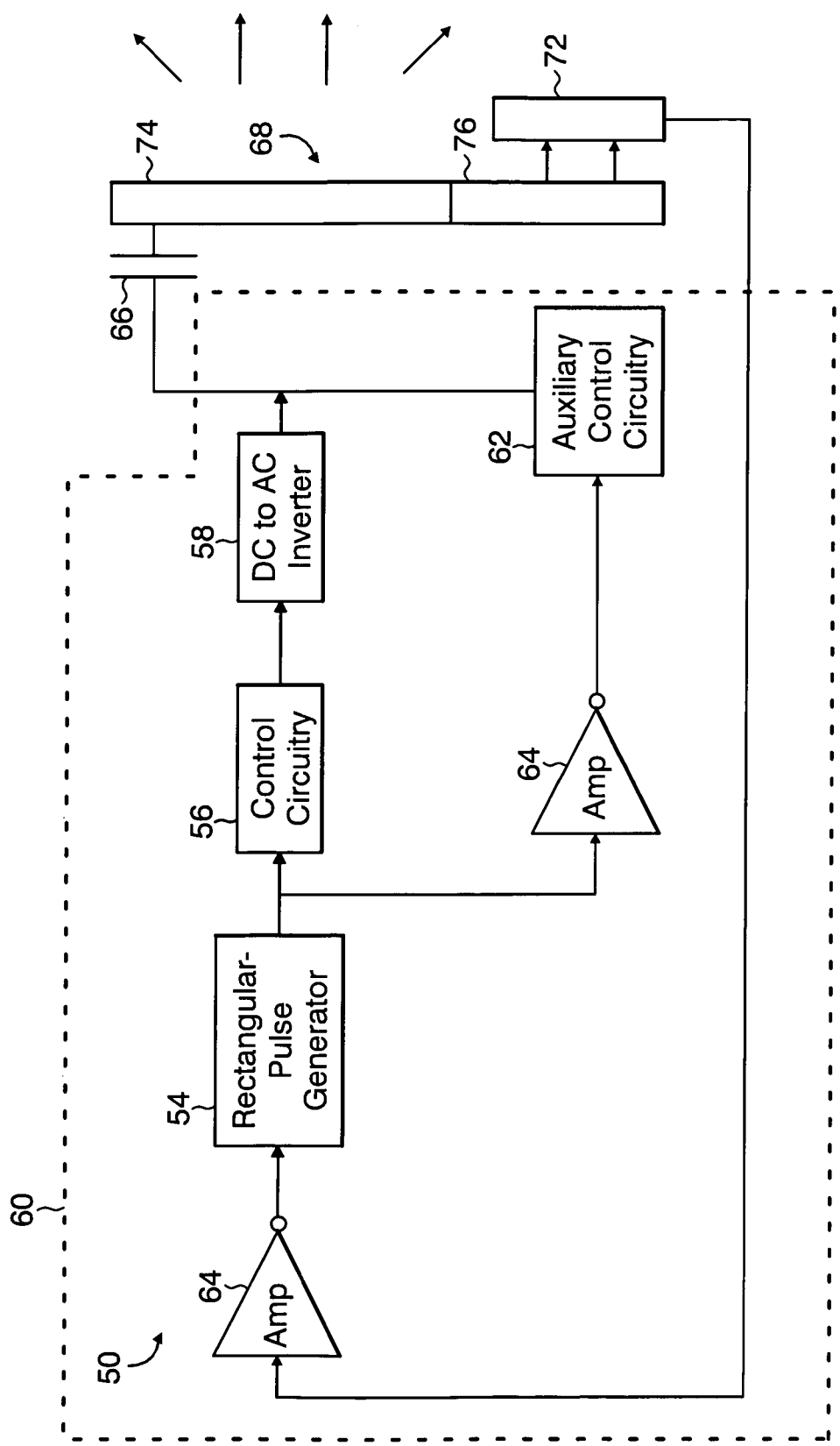
FIG. 2 shows a block-diagram of the EL light source driver circuit of the present invention.

FIG. 2 shows a block-diagram of the driver 50 of the present invention with the EL light source 68 connected to it. The driver 50 shown in FIG. 2 may be housed in a driver casing 60, and the driver 50 includes the following components:

a) a DC-to-AC inverter 58 similar to that described above, which generates a high-frequency quasi-sinusoidal signal;
b) a generator of pulse-width modulation of a high-frequency quasi-sinusoidal signal comprising a voltage-controlled generator 54 of rectangular pulses, control circuitry 56 of the inverter 58, a logic inverter circuit 64, and auxiliary control circuitry 62; and
c) a control unit for pulse-width modulation parameters having an EL light source 68, a photosensitive element 72, an amplifier 52 of a feedback signal from the photosensitive element 72, and a buffer capacitor 66.

The driver 50 with the EL light source 68 operates as follows. Changes in the luminescence brightness as an optical characteristic of the EL light source 68 are detected by a photosensitive element 72 and fed to the input of the voltage-controlled generator 54 through a feedback circuit comprising the EL light source 68, the photosensitive element 72, and the optical signal amplifier 52. The photosensitive element 72 may be a photo-resistor, a photo-diode, and/or a photo-transistor.

In a preferred embodiment, the EL light source is a single monolithic component, such as a light wire. In an alternative embodiment, the EL light source 68 is an integral combination of components, and includes a principal light source 74 and an auxiliary light source 76, each of which generates light. The light sources 74, 76 may be arranged and connected in parallel. The photosensitive element 72 is directed towards the auxiliary light source 76 to detect and sense the radiation of EL light therefrom, and to generate the feedback signals to the amplifier 52.

The voltage-controlled generator 54 generates rectangular pulses with an off-duty factor; that is, the duration of the interval between rectangular pulses, which is proportional to the input voltage, for example, in a relation in which a decrease in the input voltage causes a decrease in the off-duty factor. Rectangular pulses from the voltage-controlled generator are fed to the control circuitry 56, which feeds DC voltage to the input of the DC-to-AC inverter 58 in such a way that during the supply of a rectangular pulse to the control circuitry 56, direct-current voltage is supplied to the input of the DC-to-AC inverter 58, whereas during intervals between the pulses, the direct-current voltage is not supplied.

Thus, the DC-to-AC inverter 58 generates packets of quasi-sinusoidal oscillations, which are supplied to the EL light source 68 through the buffer capacitor 66. To improve the shape of the pulse packet, an auxiliary circuit is provided, comprising a logic inverter 64 and auxiliary control circuitry 62. The auxiliary control circuitry 62 is an electric circuit which commutes the output of the DC-to-AC inverter 58 in such a way that the output of the inverter 58 is short-circuited during the entire interval between rectangular pulses. Due to this circuit, pulse packets contain no characteristic attenuation "tails" associated with free oscillations in the oscillatory circuit constituted by the inductance of the inverter 58 and the capacitance of the EL light source 68. In an example embodiment, a five meter long length of EL wire, commercially available from "LYTEC", with an electric capacitance of about 30 nF, may be used as EL light source 68.

The following electronic components are used for producing the drivers 50 shown in FIG. 2:

a) a photosensitive element 72;

b) an amplifier 52 of a photosensitive element signal;

c) a rectangular-pulse generator 54;

d) control circuitry 56;

e) a logic inverter 64; f) auxiliary control circuitry 62;

g) a DC-to-AC inverter 58; and h) a buffer capacitor 66.

In an example implementation, the photosensitive element 72 is a photoresistor, such as model number GL-5539 commercially available from known sources, which detects radiation and generates a photosensitive element signal; the amplifier 52 of the photosensitive element signal is a low power dual operational amplifier, such as model number MC LM358 circuit commercially available from "MOTOROLA CORPORATION" or other known sources; the rectangular-pulse generator 54 is a model XR4151 voltage-to-frequency converter commercially available from "EXAR CORPORATION" or other known sources; the control circuitry 56 is a model number MOSFET IRFD 120 circuit commercially available from "MOTOROLA CORPORATION" or other known sources; the logic inverter 64 is a model number MC 4093 circuit commercially available from "MOTOROLA CORPORATION" or other known sources; the auxiliary control circuitry 62 is an MOSFET IRFD 120; the DC-to-AC inverter is a model number IFW5704 Db commercially available from known sources; and the buffer capacitor is any known capacitor device having a capacitance of about 30 nF at a rating of about 200 V.

Figure 3:
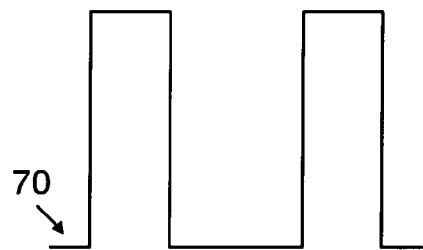
FIGS. 3–5 show rectangular low-frequency signals at the beginning, in the middle and at the end of the operating cycle of the EL light source, respectively.
Figure 4:
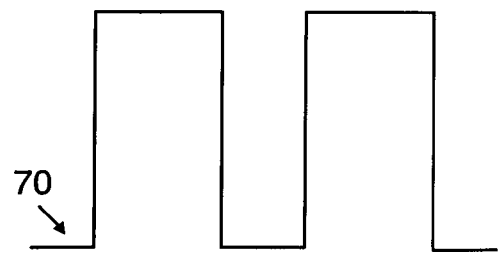
Figure 5:
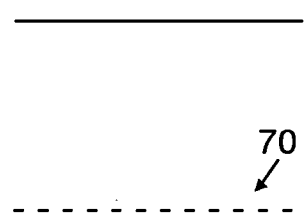

FIGS. 3–5 show rectangular pulse diagrams at the input of the control circuitry 56 at the beginning, in the middle, and at the end, respectively, of the operating cycle of the EL light source 68, with the rectangular pulses displayed relative to a base line 70, representing a zero voltage or an offset voltage level. The rectangular pulse in FIG. 5 has a continuous value above the base line 70, so the base line 70 in FIG. 5 is represented by phantom lines indicating that the base line 70 is not a part of the rectangular pulse in FIG. 5.

Figure 6:
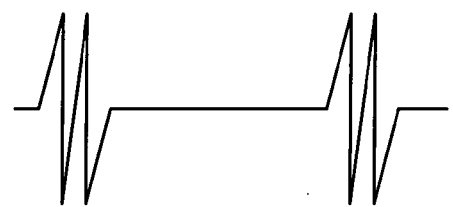
FIGS. 6–8 show packets of quasi-sinusoidal pulses at the output of DC-to-AC inverter representing the change in the duration of the interval of the rectangular low-frequency signal modulating the high-frequency sinusoidal signal at the beginning, in the middle, and at the end of the operating cycle of the EL light source, respectively.
Figure 7:
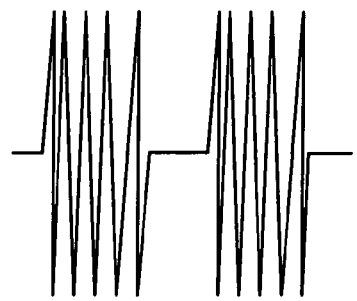
Figure 8:
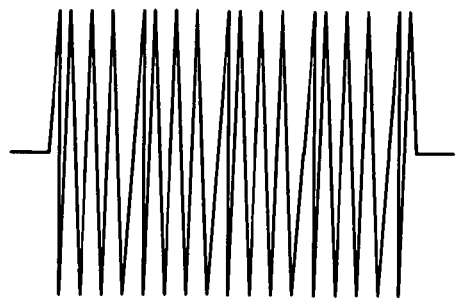

FIGS. 6–8 show packets of quasi-sinusoidal pulses at the output of DC-to-AC inverter 58 at the beginning, in the middle, and at the end, respectively, of the operating cycle of the EL light source 68, with each of the pulses in FIGS. 6–8 being respectively modulated by the rectangular pulses of FIGS. 3–5, respectively. As shown in FIG. 3, at the beginning of the operating cycle, the duration of an interval between rectangular pulses is longer than that of a pulse, for example, a pulse duration in the beginning of the operating cycle in the present embodiment is about 3 msec, while interval duration is about 7 msec. With such pulse and interval durations, the quasi-sinusoidal signal is supplied to the EL light source 68 during about 3/10 of the duration of the operation of the EL light source 68. The required initial brightness is ensured by the choice of a suitable frequency and voltage.

In an example embodiment of the present invention, the initial frequency of about 6,000 Hz and a voltage of about 110 V at the input of the EL light source 68 ensured substantially the same initial brightness as in the case of a continuous power supply by a standard inverter with the initial parameters of the output signal of about 2000 Hz/100 V. With the aging of the EL light source 68, the interval between rectangular pulses shortens, as shown in FIGS. 3–5, and, respectively, the duration of sinusoidal signal supply to the EL light source 68 increases, as shown in FIGS. 6–8. At the end of the operating cycle, the rectangular pulses effectively merge, and the intervals disappear, as shown in FIG. 5, so that quasi-sinusoidal pulses as shown in FIG. 8 are continuously supplied to the EL light source 68.

The circuit of the driver includes a buffer capacitor 66 connected in series with EL light source 68, thus constituting a divider of voltage potential. With the aging of the EL light source 68 and, respectively, with an increase in its impedance, the voltage drop on this voltage potential divider is redistributed in such a way that the voltage on the EL light source grows, which leads to an increase in the lifetime of the EL light source 68.

In an example embodiment of the present invention, the initial capacitance of the EL light source is about 30 nF, and the buffer capacitance is also equal to about 30 nF. During the operating cycle, the capacitance of the EL light source 68 decreased down to about 22 nF. While in the beginning of the operating cycle, the voltage on the EL light source 68 is about 110 V, by the end of the operating cycle, the voltage on the EL light source 68 reaches about 125 V.

EXPERIMENTAL RESULTS

Figure 1:
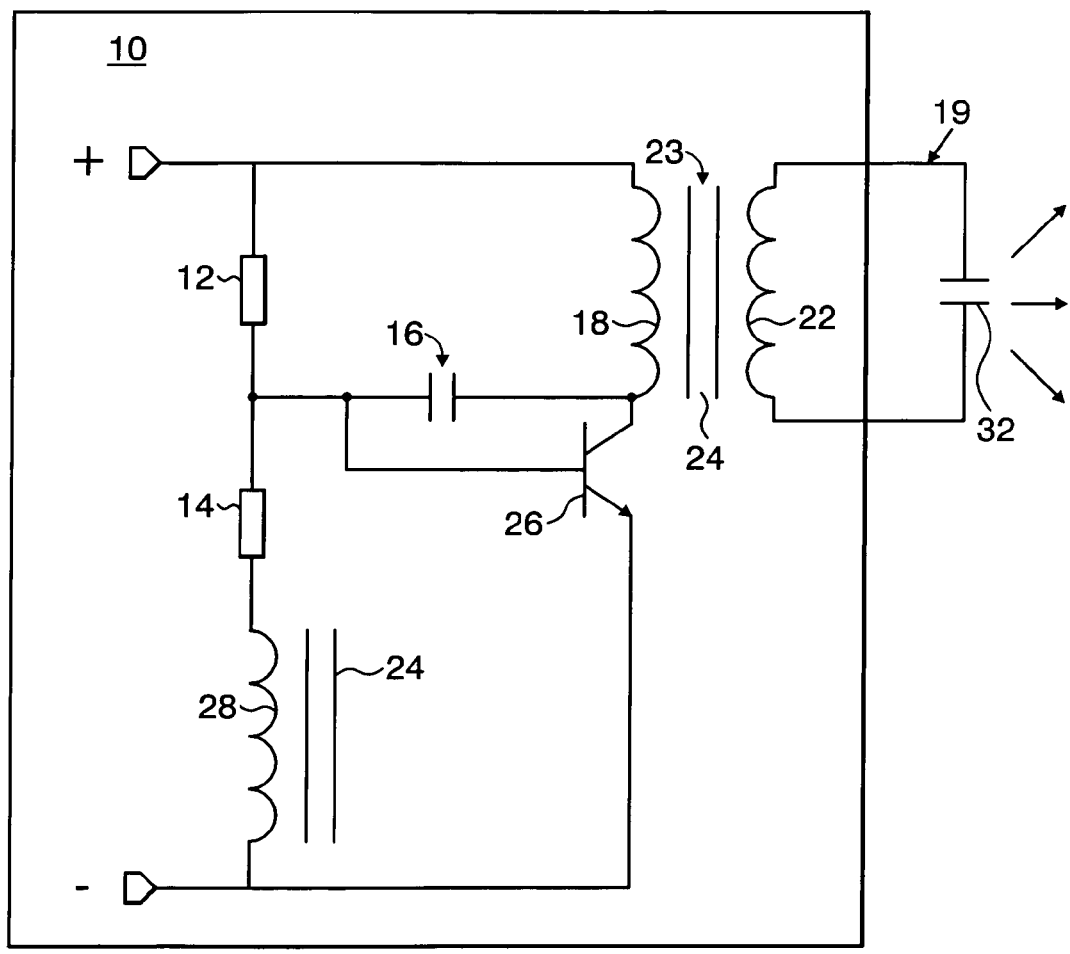
FIG. 1 shows an electrical schematic diagram of one of the widely used types of standard DC-to-AC inverters for EL light sources in the prior art.
Figure 9:
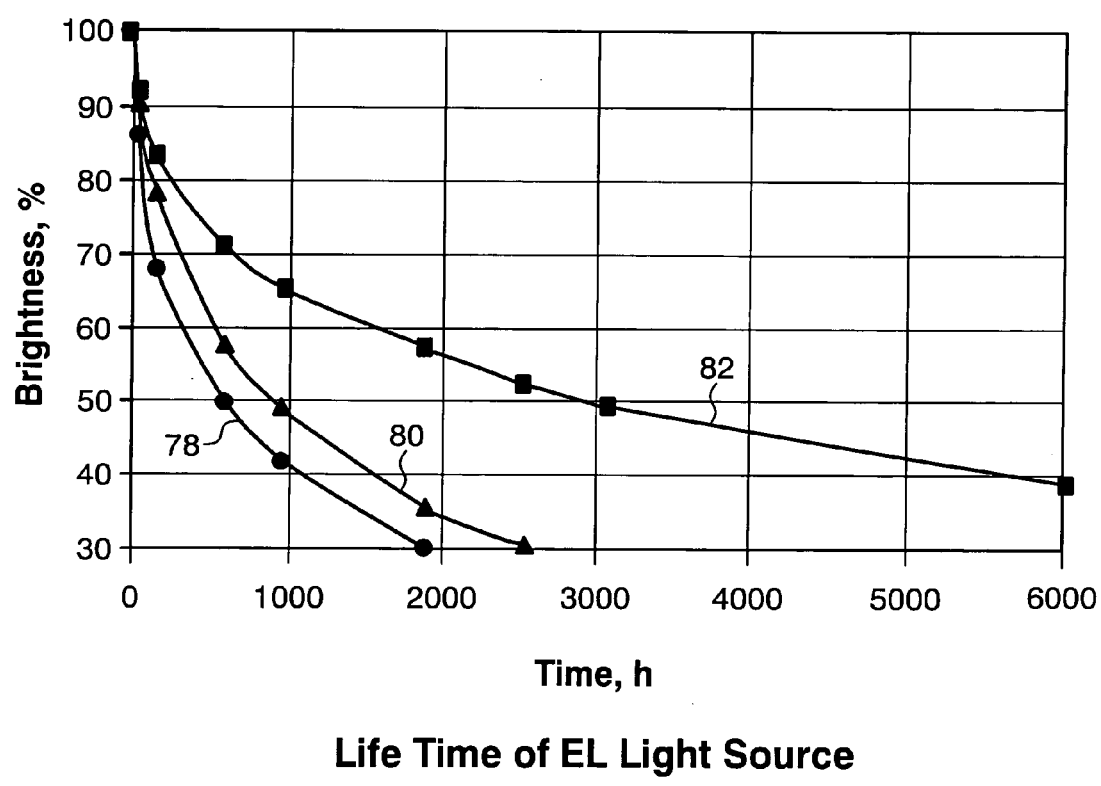
FIG. 9 depicts the relation of brightness to the operation time for identical EL light sources in case of standard drivers and drivers of the present invention.

FIG. 9 shows brightness dependencies on the luminescence time for three identical EL light sources, which measure brightness changes in units of percentage against time measured in hours. Curve 78 relates to an EL light source fed with sinusoidal oscillations with constant frequency and amplitude. Curve 80 relates to an inverter-operated EL light source, with the electrical schematic diagram of the inverter in the prior art presented in FIG. 1. Curve 82 relates to an EL light source operation with the driver of the present invention. In the three cases, the initial brightness of EL light sources was identical at about 100 $Cd/m^2$.

It is obvious from FIG. 9 that the lifetime 82 of the EL light source operation of the present invention is greatly improved over the prior art operations, shown as curves 78, 80. The lifetime represented by the curve 82 is longer than the lifetimes represented by the curves 78, 80, such as being approximately three-fold longer than in curve 80 and about 4.5-fold longer than in curve 78; for example, when the brightness has dropped to about 40%.

Figure 10:
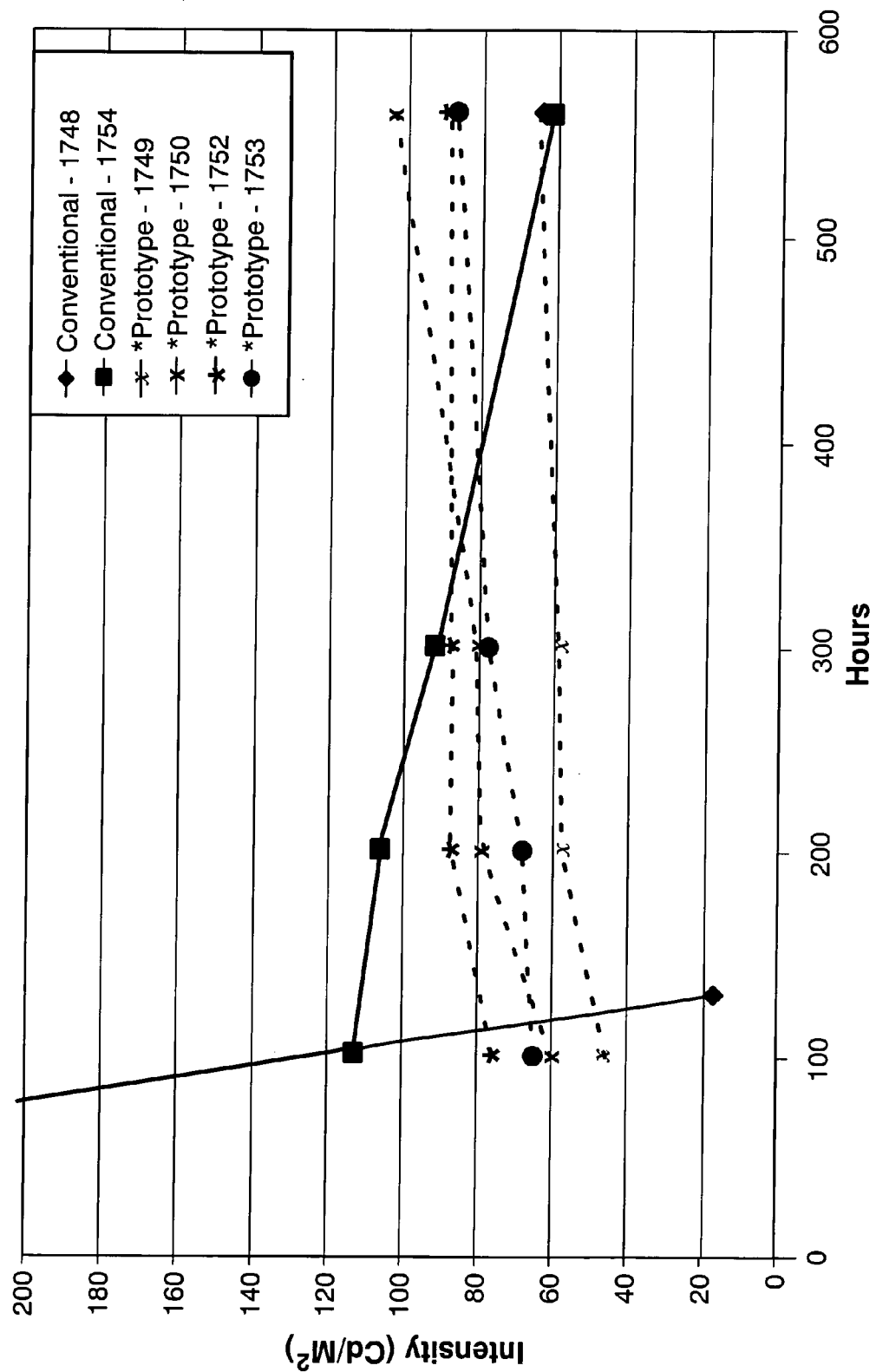
FIG. 10 shows the relation of intensity to the operation time for prototype EL light sources against conventional light sources.

As shown in FIG. 10, prototypes of the EL light source of the present invention were tested and compared to convention light sources over about 560 hours of continuous operation, with data for the intensity in $Cd/m^2$ against hours listed as shown in Table 3.

TABLE 3

| System | Unit ID Number | A | B | C | D | Light Output Maintenance (%) |
|---|---|---|---|---|---|---|
| Conventional | 1754 | 112.69 | 105.72 | 91.60 | 60.79 | 53.94 |
| Prototype | 1749 | 45.49 | 57.29 | 58.90 | 64.73 | 142.29 |
| Prototype | 1750 | 59.93 | 78.51 | 80.10 | 103.8 | 173.20 |
| Prototype | 1752 | 75.66 | 87.16 | 87.27 | 88.57 | 117.07 |
| Prototype | 1753 | 64.66 | 67.81 | 77.28 | 86.75 | 134.17 | in which column A represents the intensity in $Cd/m^2$ after 100 hours, being an average of three data points of measurement; column B represents the intensity in $Cd/m^2$ after 200 hours, being an average of three data points of measurement; column C represents the intensity in $Cd/m^2$ after 300 hours, being an average of three data points of measurement; and column D represents the intensity in $Cd/m^2$ after 560 hours, based on one data point of measurement. The light output maintenance measures the ratio, as a percentage, of the intensity of a given test device at 560 hours to the intensity of the given test device at 100 hours.

A further conventional system having unit ID number 1748 presented anomalous intensity readings after only about 120 hours. Its performance is also presented in FIG. 10. The EL light sources of the present invention, as demonstrated by operational prototypes, clearly provide superior intensity during both short and long periods of operation compared to conventional light sources, even over relatively short durations, such as over about 560 hours.

While the preferred embodiment of the present invention has been shown and described herein, it will be obvious that such embodiment is provided by way of example only. Numerous variations, changes and substitutions will occur to those skilled in the art without departing from the invention herein. Accordingly, it is intended that the invention be limited only by the spirit and scope of the appended claims.

What is claimed is:

1. An electroluminescent (EL) device comprising:
   an EL light source; and
   a driver, wherein the driver includes:
      a DC-to-AC inverter for generating a high-frequency sinusoidal signal; and
      a generator of low-frequency rectangular pulses;
      wherein the DC-to-AC inverter and the generator are connected to feed the sinusoidal signal to the EL light source in packets with a duration equal to a duration of the rectangular pulses; and
      wherein the duration of intervals between the rectangular pulses, with no voltage supplied to the EL light source, is determined by changes in optical characteristics of the EL light source during the course of operation.

2. The electroluminescent device according to claim 1, wherein the driver includes:
   an electric circuit for shorting the output of the DC-to-AC inverter during the entire period of the interval between the rectangular pulses.

3. The electroluminescent device according to claim 1, further comprising:
   a buffer capacitor connected in series with the EL light source.

4. The electroluminescent device according to claim 1, wherein the EL light source is an EL wire.

5. The electroluminescent device according to claim 1, further comprising:
   an optical feedback circuit including:
      a photosensitive element for detecting radiation from the principal EL light source, and for generating a photosensitive element signal; and
      an amplifier for amplifying the photosensitive element signal;
   wherein the EL light source and the rectangular-pulse generator are connected via the optical feedback circuit to receive and to be controlled by the amplified photosensitive element signal.

6. The electroluminescent device according to claim 5, wherein the photosensitive element is a photoresistor.

7. The electroluminescent device according to claim 5, wherein the photosensitive element is a photo-diode.

8. The electroluminescent device according to claim 5, wherein the photosensitive element is a photo-transistor.

9. The electroluminescent device according to claim 5, wherein the EL light source includes:
   a principal EL light source; and
   an auxiliary EL light source enclosed in a driver casing housing the driver, with the auxiliary EL light source radiating light and being connected in parallel with the principal EL light source, with the radiation of light from the auxiliary EL light source being sensed by the photosensitive element.

10. An electroluminescent (EL) device comprising:
    an EL light source; and
    a driver having:
       a rectangular-signal generator for generating a modulating rectangular signal with intervals between rectangular pulses; and
       a modulated-signal generator, responsive to the modulating rectangular signal, for generating a pulse-width modulated high-frequency quasi-sinusoidal signal fed to the EL light source;
    wherein the duration of the intervals in the modulating rectangular signal is determined by the change in optical characteristics of the EL light source, which are detected by a photosensitive element and fed through a feedback circuit to an input of the rectangular signal generator to control the generation of the modulating rectangular signal.

* * * * *